United States Patent
Zheng et al.

(10) Patent No.: US 12,301,514 B2
(45) Date of Patent: May 13, 2025

(54) SPATIAL RELATION UPDATE ACROSS MULTIPLE COMPONENT CARRIERS

(71) Applicant: QUALCOMM Incorporated, San Diego, CA (US)

(72) Inventors: Ruiming Zheng, Beijing (CN); Yan Zhou, San Diego, CA (US); Yu Zhang, San Diego, CA (US); Linhai He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/756,701

(22) PCT Filed: Dec. 16, 2020

(86) PCT No.: PCT/CN2020/136672
§ 371 (c)(1),
(2) Date: May 31, 2022

(87) PCT Pub. No.: WO2021/121238
PCT Pub. Date: Jun. 24, 2021

(65) Prior Publication Data
US 2023/0006806 A1    Jan. 5, 2023

(30) Foreign Application Priority Data
Dec. 19, 2019   (WO) ................ PCT/CN2019/126520

(51) Int. Cl.
*H04L 5/00*    (2006.01)

(52) U.S. Cl.
CPC .......... *H04L 5/0096* (2013.01); *H04L 5/0051* (2013.01)

(58) Field of Classification Search
CPC ........................... H04L 5/0096; H04L 5/0051
See application file for complete search history.

(56) References Cited

U.S. PATENT DOCUMENTS 9,973,250 B2   5/2018  Noh et al.
2019/0082425 A1  3/2019  Li et al.
(Continued)

FOREIGN PATENT DOCUMENTS

| CN | 110474724 A | 11/2019 |
| CN | 110535601 A | 12/2019 |

(Continued)

OTHER PUBLICATIONS

CMCC: "Enhancements on Multi-Beam Operation", 3GPP TSG RAN WG1 #99, R1-1912543, 3rd Generation Partnership Project, Mobile Competence Centre, 650, Route Des Lucioles, F-06921 Sophia-Antipolis Cedex, France, vol. RAN WG1, No. Reno, USA, Nov. 18-22, 2019, Nov. 9, 2019 (Nov. 9, 2019), 4 pages, The whole document, p. 2, section 2.2 Enhancement on updating spatial relation for SP/AP-SRS for a set of CCs/BWPs.

(Continued)

*Primary Examiner* — Shukri Taha
(74) *Attorney, Agent, or Firm* — Harrity & Harrity, LLP

(57) ABSTRACT

A method, an apparatus, and a computer program product for wireless communication are provided. A base station (BS) may configure a component carrier group for a user equipment (UE). The BS may provide an indication of a spatial relation for one or more sounding reference signals associated with a component carrier of the component carrier group. The UE may receive the indication and may apply the spatial relation to the one or more sounding reference signals across bandwidth parts of component carriers of the component carrier group.

30 Claims, 11 Drawing Sheets

(56) References Cited

U.S. PATENT DOCUMENTS

2019/0335524 A1   10/2019  Wang et al.
2019/0349964 A1*  11/2019  Liou ..................... H04W 76/27
2021/0014848 A1*  1/2021  Davydov .............. H04W 72/23
2023/0028119 A1*  1/2023  Gao ................... H04B 7/06962

FOREIGN PATENT DOCUMENTS

CN         110536440 A    12/2019
WO    WO-2019203711 A1  10/2019

OTHER PUBLICATIONS

Supplementary European Search Report—EP20902720—Search Authority—The Hague—Dec. 21, 2023.
ERICSSON: "Feature Lead Summary 3 of Beam Measurement and Reporting", 3GPP Draft; R1-1801187, 3GPP TSG RAN WG1 Meeting AH 1801, Feature Lead Summary 3 of Beam Measurement and Reporting V2, 3rd Generation Partnership Project(3GPP), Mobile Competence Centre, 650, Route Des Lucioles, F-06921 Sophia-Antipolis Cedex, France, vol. RAN WG1, No. Vancouver, Canada, Jan. 22-26, 2018, Jan. 29, 2018, pp. 1-13, XP051385416, Retrieved from the Internet: URL: http://www.3gpp.org/ftp/tsg%5Fran/WG1%5FRL1/TSGR1%5FAH/NR%5FAH%5F1801/Docs/ [retrieved on Jan. 29, 2018], Sections 2.1-2.4, 4.2.1, 4.3, 4.6,7, the Whole Document.
International Search Report and Written Opinion—PCT/CN2019/126520—ISA/EPO—Sep. 24, 2020.
International Search Report and Written Opinion—PCT/CN2020/136672—ISA/EPO—Feb. 25, 2021.
Samsung: "RAN1 Session Notes for Agenda Item 7.2 (MIMO)", 3GPP TSG RAN WG1 Meeting AH 1801, R1-1801130, Vancouver, Canada, Jan. 22-26, 2018, Jan. 26, 2018 (Jan. 26, 2018) The Whole Document, 33 Pages.
CMCC: "Enhancements on Multi-beam Operation", 3GPP TSG RAN WG1 #99, R1-1912543, 3rd Generation Partnership Project, Mobile Competence Centre, 650, Route Des Lucioles, F-06921 Sophia-Antipolis Cedex, France, vol. RAN WGI, No. Reno, USA, Nov. 18, 2019-Nov. 22, 2019, Nov. 9, 2019, 4 Pages, XP05182347, Abstract, Description.

* cited by examiner

| | | | | | | | |
|---|---|---|---|---|---|---|---|
| A/D | R | R | | | | Serving Cell ID$_1$ | Oct 1 |
| R | R | R | | | | Serving Cell ID$_2$ | Oct 2 |

...

| R | R | R | | | | Serving Cell ID$_K$ | Oct K |
| R | R | C | SUL | | | AP/SP SRS Resource Set ID | Oct K+1 |
| F$_0$ | | | | | | Resource ID$_0$ | Oct K+2 |

...

| F$_{M-1}$ | R | | | | | Resource ID$_{M-1}$ | Oct N-M |
| | | | | | | Resource Serving Cell ID$_0$ / Resource BWP ID$_0$ | Oct N-M+1 |

...

| R | | | | | | Resource Serving Cell ID$_{M-1}$ / Resource BWP ID$_{M-1}$ | Oct N |

SPATIAL RELATION UPDATE ACROSS MULTIPLE COMPONENT CARRIERS

CROSS-REFERENCE TO RELATED APPLICATION

This Patent Application is a 371 national stage of Patent Cooperation Treaty (PCT) Application No. PCT/CN2020/136672 filed on Dec. 16, 2020, entitled "SPATIAL RELATION UPDATE ACROSS MULTIPLE COMPONENT CARRIERS," which claims priority to Patent Cooperation Treaty (PCT) Patent Application No. PCT/CN2019/126520, filed on Dec. 19, 2019, entitled "SPATIAL RELATION UPDATE ACROSS MULTIPLE COMPONENT CARRIERS." The disclosure of the prior Applications are considered part of and are incorporated by reference into this Patent Application.

BACKGROUND

Field

Aspects of the present disclosure generally relate to wireless communication and to techniques and apparatuses for spatial relation update.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some communications systems, such as 5G, a base station (BS) may transmit a medium access control (MAC) control element (CE) to configure a spatial relation for an uplink reference signal resource set for a cell. For example, the BS may provide, to a UE and for a component carrier associated with the cell, a MAC CE to activate a spatial relation for a sounding reference signal (SRS) resource (e.g., a semi-persistent SRS or an aperiodic SRS). To activate spatial relations for a plurality of component carriers, the BS may transmit a plurality of MAC CEs to the UE. However, when the BS transmits a plurality of MAC CEs, the BS may use excessive network resources. Moreover, to receive the plurality of MAC CEs, a UE may use excessive power resources.

Some aspects described herein may enable a BS to group a plurality of component carriers and transmit a single indicator of a spatial relation to update uplink reference signal resource sets across the plurality of component carriers. For example, the BS may provide first information identifying one or more groups of component carriers and may provide second information, which may be the aforementioned single indicator, identifying a spatial relation for at least one component carrier of the one or more groups of component carriers. In this case, the UE may identify a particular group of component carriers that includes the at least one component carrier. Further, the UE may apply the spatial relation to SRS resource sets across the particular group of component carriers. In this way, the BS may reduce signaling and UE utilization of power resources relative to transmitting a plurality of MAC CEs to configure spatial relations for a corresponding plurality of uplink reference signal resource sets.

In an aspect of the disclosure, a method, a UE, an apparatus, and a computer program product are provided.

In some aspects, a method of wireless communication performed by a UE includes receiving a spatial relation update indication identifying a spatial relation for one or more sounding reference signal resources; and configuring communication on a plurality of component carriers with the spatial relation for the one or more sounding reference signal resources based at least in part on receiving the spatial relation update indication.

In some aspects, a UE for wireless communication includes a memory and one or more processors operatively coupled to the memory, the memory and the one or more processors configured to: receive a spatial relation update indication identifying a spatial relation for one or more sounding reference signal resources; and configure communication on a plurality of component carriers with the spatial relation for the one or more sounding reference signal resources based at least in part on receiving the spatial relation update indication.

In some aspects, a non-transitory computer-readable medium storing a set of instructions for wireless communication includes one or more instructions that, when executed by one or more processors of a UE, cause the UE to: receive a spatial relation update indication identifying a spatial relation for one or more sounding reference signal resources; and configure communication on a plurality of component carriers with the spatial relation for the one or more sounding reference signal resources based at least in part on receiving the spatial relation update indication.

In some aspects, an apparatus for wireless communication includes means for receiving a spatial relation update indication identifying a spatial relation for one or more sounding reference signal resources; and means for configuring communication on a plurality of component carriers with the spatial relation for the one or more sounding reference signal resources based at least in part on receiving the spatial relation update indication.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 3A-3F are diagrams illustrating one or more examples of spatial relation updating.

DETAILED DESCRIPTION

Figure 1:
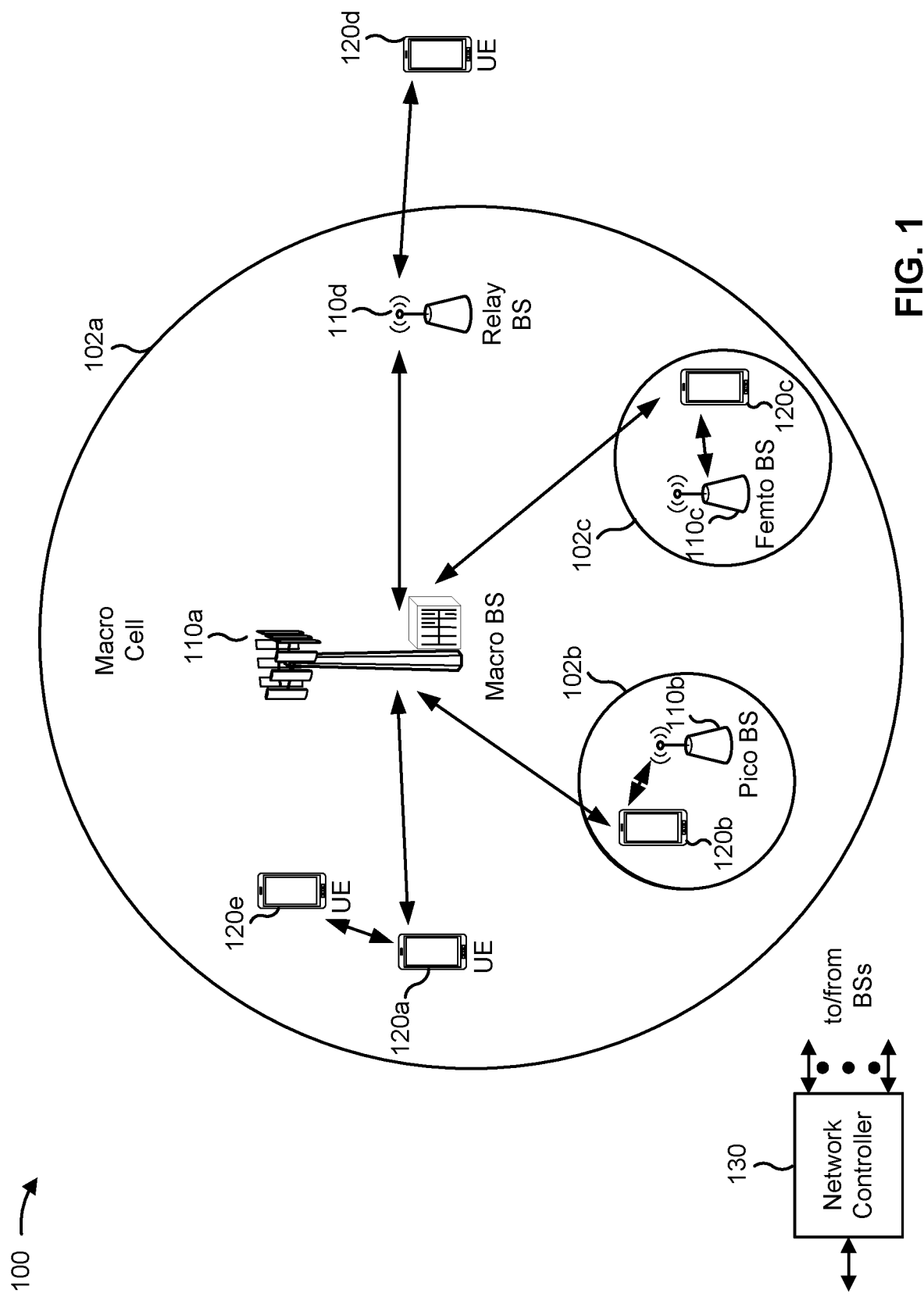
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 5G wireless technologies, aspects of the present disclosure can be applied in other generation-based communication systems.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

Some UEs may be connected to one or more BSs via a plurality of component carriers associated with a plurality of bandwidth parts in a common band (e.g., frequency band 1 (FR1), frequency band 2 (FR2), and/or the like. A UE may use spatial relation information for communicating with the BS, such as for aperiodic or semi-persistent SRS transmission. The UE may receive signaling from the BS indicating an update to a spatial relation for an SRS resource (e.g., a semi-persistent SRS or an aperiodic SRS), for example, an SRS resource set on a particular component carrier, and may apply the spatial relation to other SRS resources, for example, to other SRS resource sets on other component carriers based at least in part on a configured component carrier grouping.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
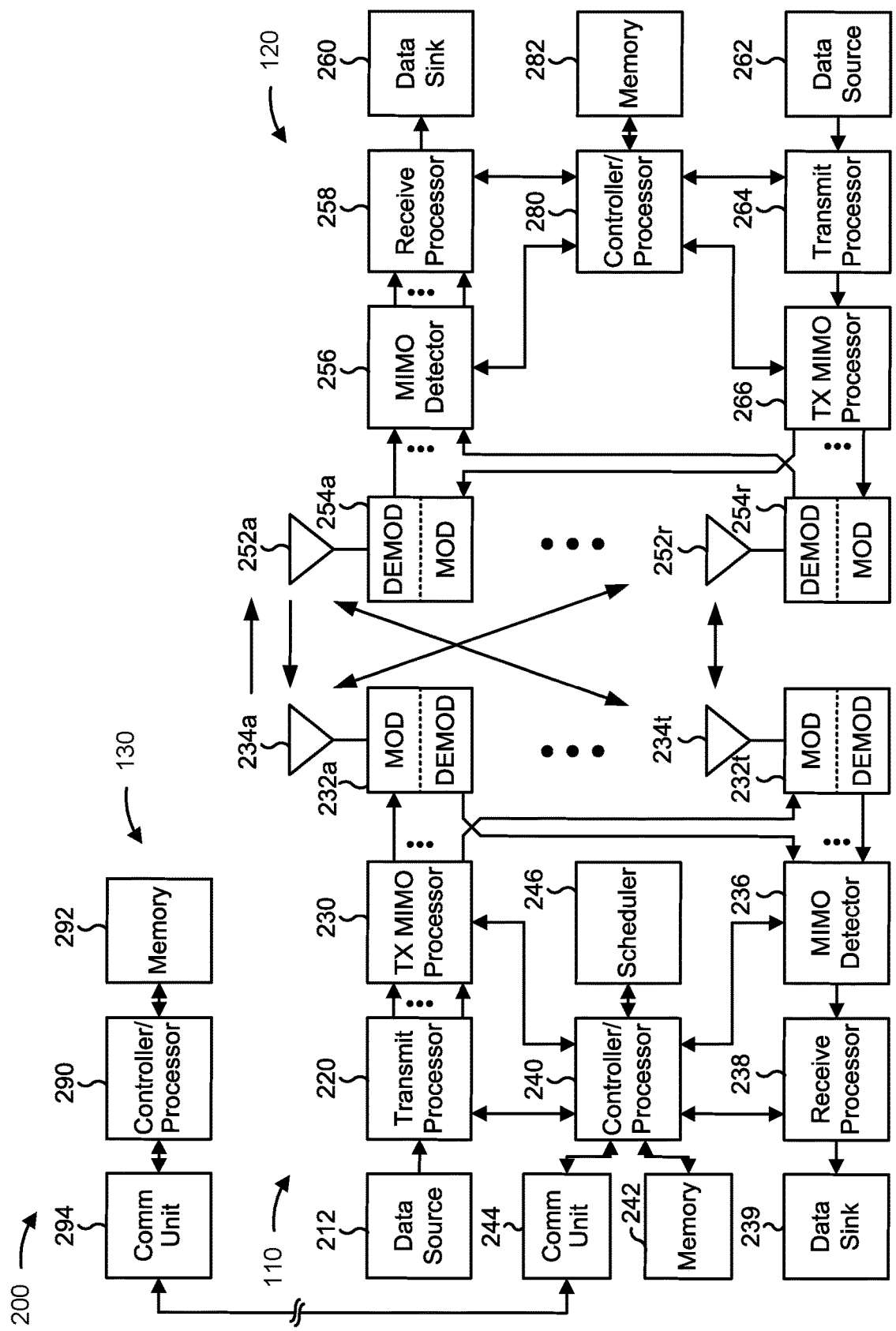
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Further, BS 110 (e.g., using transmit processor 220 or a receive processor 238) may select spatial relation information for each UE and may communicate the spatial relation information to each UE. In some cases, the spatial relation information may be associated with a spatial relation update. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a spatial relation update, as described in more detail elsewhere herein. For example, controller/processor 240 of base station 110, controller/processor 280 of UE 120, and/or any other component(s) of FIG. 2 may perform or direct operations of, for example, method 400 of FIG. 4 and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

"5G" may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using time-division duplexing (TDD). In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

A single component carrier bandwidth of 100 MHz may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such as central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3A:
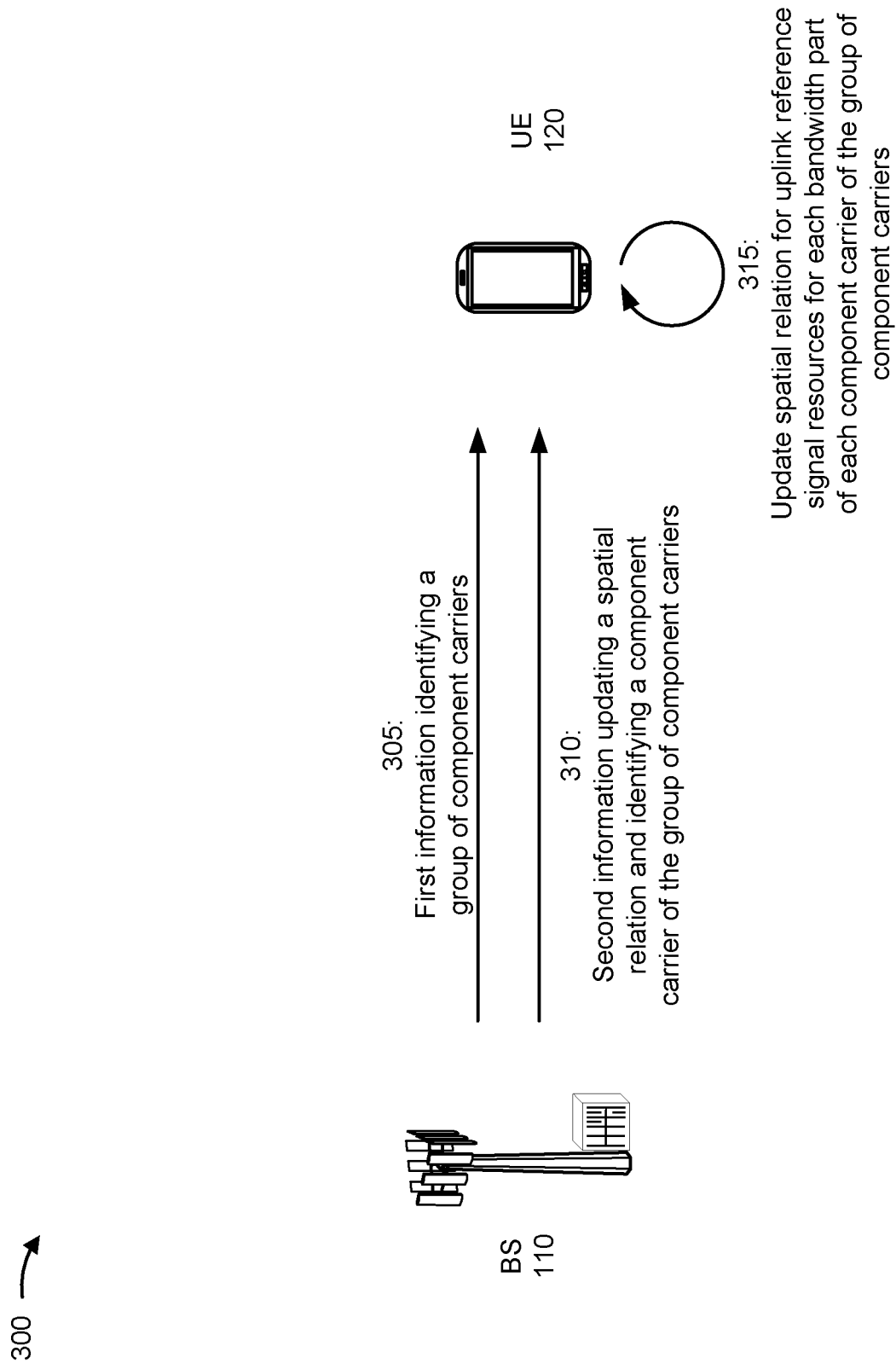

FIGS. 3A-3F are diagrams illustrating an example 300 of spatial relation updating. As shown in FIG. 3A, example 300 includes a BS 110 and a UE 120.

Figure 3B:
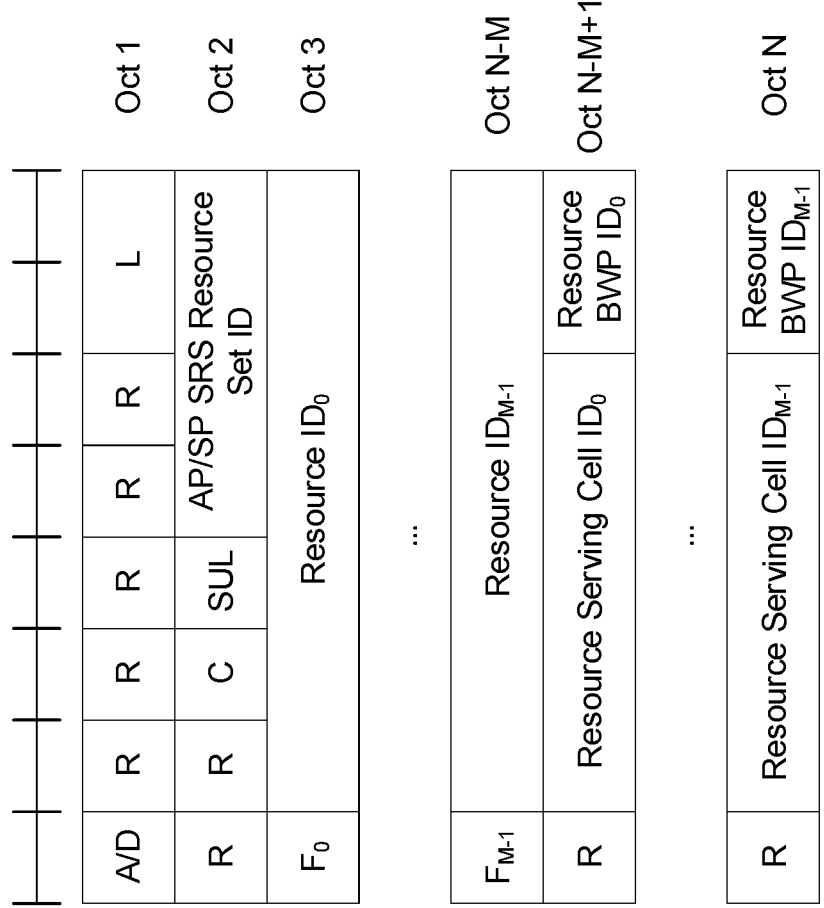
Figure 3C:
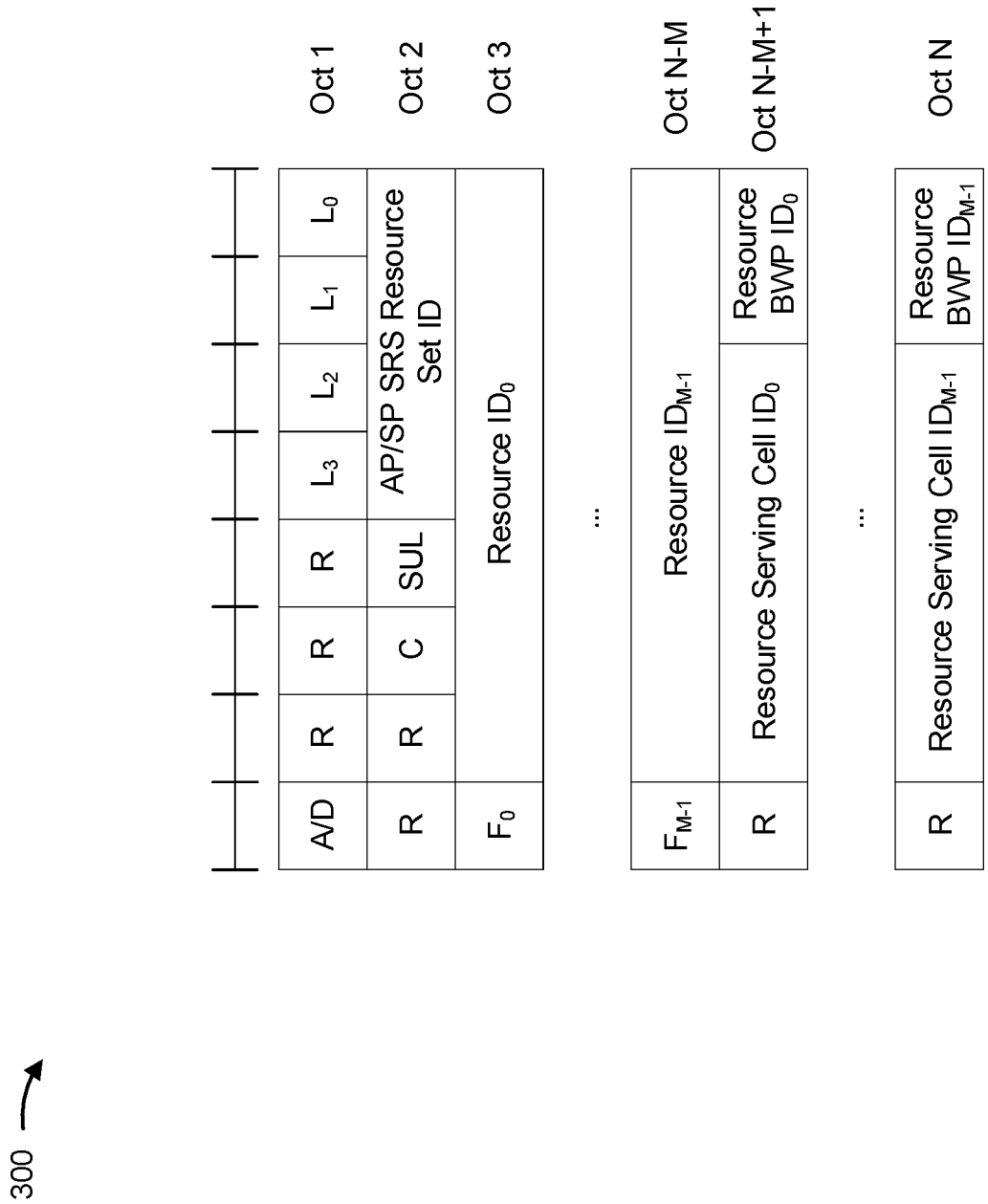

At 305 and 310, BS 110 may transmit first information identifying a group of component carriers and second information updating a spatial relation and identifying a component carrier of the group of component carriers. Accordingly, the second information may be spatial relation information. For example, BS 110 may transmit first information, via radio resource control (RRC) signaling, identifying a list of component carriers. In some aspects, UE 120 may store the first information to enable UE 120 to subsequently apply same spatial relation information to uplink reference signal resources for each bandwidth part of each component carrier of the list of component carriers. In some configurations, the second information includes a spatial relation update indication (or indicator) indicating a spatial relation to update. For example, at a subsequent time, BS 110 may transmit a medium access control (MAC) control element (CE) conveying a spatial relation update indication identifying a spatial relation for one or more SRS resources. In some aspects, the spatial relation update indication may identify one or more component carriers corresponding to one or more component carrier groups. In this case, UE 120 may determine that the explicitly identified one or more component carriers are included in one or more component carrier groups identified in the list of component carriers and may determine to update each component carrier of the one or more component carrier groups based at least in part on the spatial relation information. In this case, UE 120 applies the spatial relation to other component carriers, of the one or more component carrier groups, not explicitly identified in the MAC CE (e.g., and which are implicitly identified by association with the one or more component carriers that are explicitly identified in the MAC CE). For example, as shown in FIG. 3B, an octet of a MAC CE (e.g., Oct 1) may include a set of bits reserved for conveying a list identifier, L. In this case, L is a 2 bit field that can represent any of 4 different component carrier lists. In contrast, as shown in FIG. 3C, an octet of a MAC CE (e.g., Oct 1) may include a bitmap reserved for conveying a set of list identifiers, $L_0$ through $L_3$. Based at least in part on receiving the MAC CE, UE 120 may update an SRS resource, such as an aperiodic (AP) or semi-persistent (SP) SRS resource set identified by a respective identifier (ID) included in an AP/SP SRS Resource Set ID field of a MAC CE (e.g., as shown by Octet (Oct) 2 in FIG. 3B). In this case, the SRS resource set may be one of a plurality of sets of one or more of the 4 different component carrier lists with one or more spatial relations identified in the MAC CE. In this way, a bitmap may identify component carriers (e.g., explicitly or by association to a group of component carriers in a component carrier list). Although some aspects are described herein in terms of a particular quantity of component carrier lists, other quantities and configurations of component carrier groups may be used.

In some aspects, BS 110 may include information identifying the list of component carriers in a cell group level parameter, such as a cell group configuration parameter. In this case, BS 110 may include the list identifier in the MAC CE transmitted to UE 120 to cause the update to the spatial relation information. Additionally, or alternatively, UE 120 may determine that the MAC CE was received on a particular component carrier and may apply the spatial relation information to SRS resource sets (e.g., identified by the AP/SP SRS Resource Set ID field of the MAC CE) on each component carrier included in the same list of component carriers as the particular component carrier. Additionally, or alternatively, BS 110 may use a UE-specific parameter, such as a serving cell configuration, to convey the component carrier list identifier. Additionally, or alternatively, BS 110 may use an SRS resource set (e.g., a semi-persistent or aperiodic SRS resource set, such as an AP/SP SRS Resource Set ID field of the MAC CE) to convey the component carrier list identifier, and a MAC CE to select the list identifier for spatial relation update.

In some aspects, BS 110 may transmit RRC signaling to identify a list of component carriers, and may configure a list identifier in an uplink reference signal resource set. For example, UE 120 may receive first information indicating an association between SRS resource sets (e.g., aperiodic or semi-persistent SRS resource sets) in a plurality of cells. In this case, UE 120 may receive second information updating the spatial relation information for an SRS resource set in a first cell and may apply the updated spatial relation information to SRS resource sets in one or more other cells sharing a list identifier with the first cell. In a contrasting example, when UE 120 receives the second information (e.g., to identify a spatial relation for an uplink reference signal resource set of a single component carrier) but has not received the first information (e.g., to identify a list of component carriers), UE 120 may update the single component carrier, thereby enabling operation when component carrier lists are not configured.

Figure 3D:
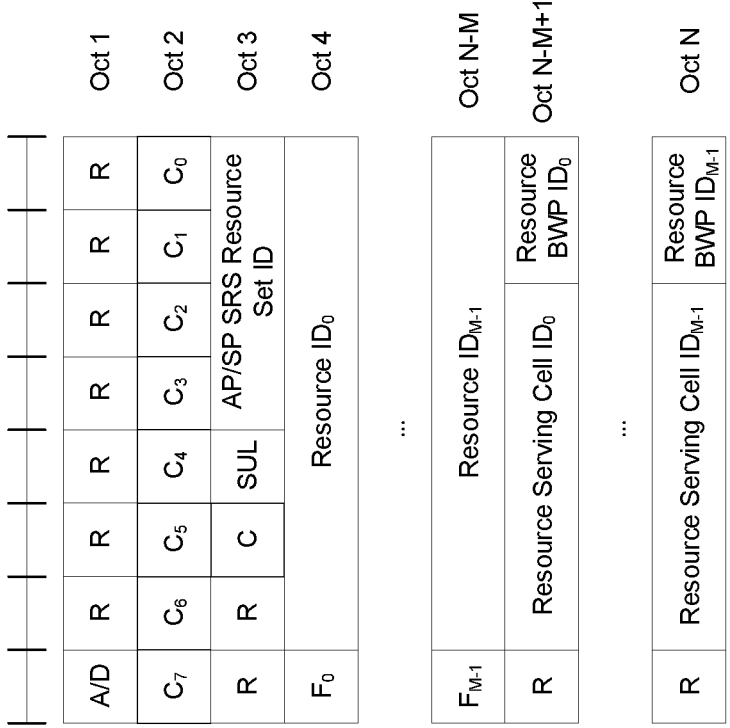
Figure 3E:
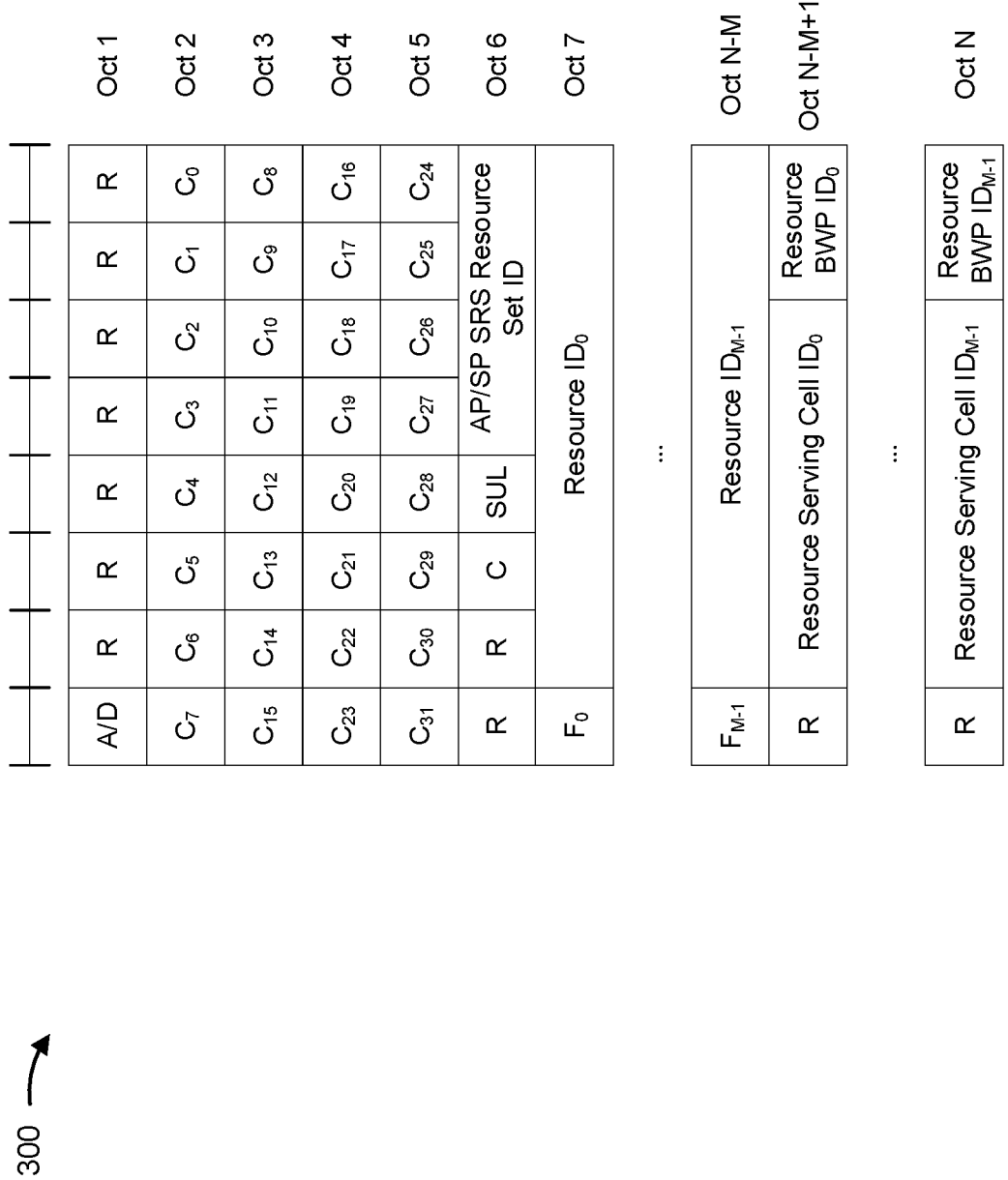

In some aspects, BS 110 may transmit the first information and the second information using common signaling. For example, BS 110 may transmit a MAC CE including information identifying a plurality of cells for which to update spatial relation information for respective uplink reference signal resource sets. In this case, the MAC CE may include a bitmap corresponding to a plurality of cells or component carriers, a set of explicit cell identifiers, and/or the like to identify the plurality of cells. In this case, as shown in FIG. 3D, the MAC CE includes an octet (e.g., Oct 2) including a set of bits, $C_0$ through $C_7$, for identifying up to 8 cells for which an SRS resource set is to be updated with identified spatial relation information. Similarly, as shown in FIG. 3E, the MAC CE may include a plurality of octets (e.g., Oct 2 through Oct 5) including a set of bits $C_0$ through $C_{31}$ for identifying up to 32 cells for which an SRS resource set is to be updated with identified spatial relation information. In contrast, as shown in FIG. 3F, the MAC CE may include a plurality of octets (e.g., Octet 1 through Octet K) each including a set of bits for conveying a cell identifier (e.g., Serving Cell $ID_i$) for identifying up to K cells for which an SRS resource set is to be updated with spatial relation information.

Additionally, each of the MAC CEs depicted in FIGS. 3B-3F may further include one or more of the following fields: an SRS Resource Set's Cell ID field (see, e.g., Oct 2 in FIG. 3B) that indicates the identity of the Serving Cell and that includes the indicated SP/AP SRS Resource Set; one or more Resource Di field(s) (see, e.g., Oct 3 to Oct N-M in FIG. 3B), each of which includes an identifier of the resource used for spatial relationship derivation for SRS resource i; one or more Resource Serving Cell IDi fields (see, e.g., Oct N-M+1 to Oct N in FIG. 3B), each of which indicates the identity of the Serving Cell on which the resource used for spatial relationship derivation for SRS resource i is located; one or more Resource BWP IDi fields (see, e.g., Oct N-M+1 to Oct N in FIG. 3B), each of indicates a UL BWP as the codepoint of the DCI bandwidth part indicator field on which the resource used for spatial relationship derivation for SRS resource i is located; among other examples.

Referring again to FIG. 3A, at 315, UE 120 may update the spatial relation for uplink reference signal resources, such as one or more SRS resources, for each bandwidth part of each component carrier of the group of component carriers. For example, as described above, UE 120 may apply identified spatial relation information to SRS resource sets identifying the one or more SRS resources of a plurality of component carriers (e.g., explicitly by identifiers or implicitly by association, as described above) in signaling from BS 110. In some aspects, the plurality of component carriers may be distributed across a plurality of serving cells or a plurality of bandwidth parts, among other examples. In this way, UE 120 enables update of spatial relation for SRS resources (e.g., when identified by a plurality of SRS resource sets), using reduced signaling, relative to separately signaling each spatial relation update for each SRS resource of an SRS resource set on each component carrier and/or bandwidth part.

As indicated above, FIGS. 3A-3F are provided as examples. Other examples may differ from what is described with respect to FIGS. 3A-3F.

Figure 4:
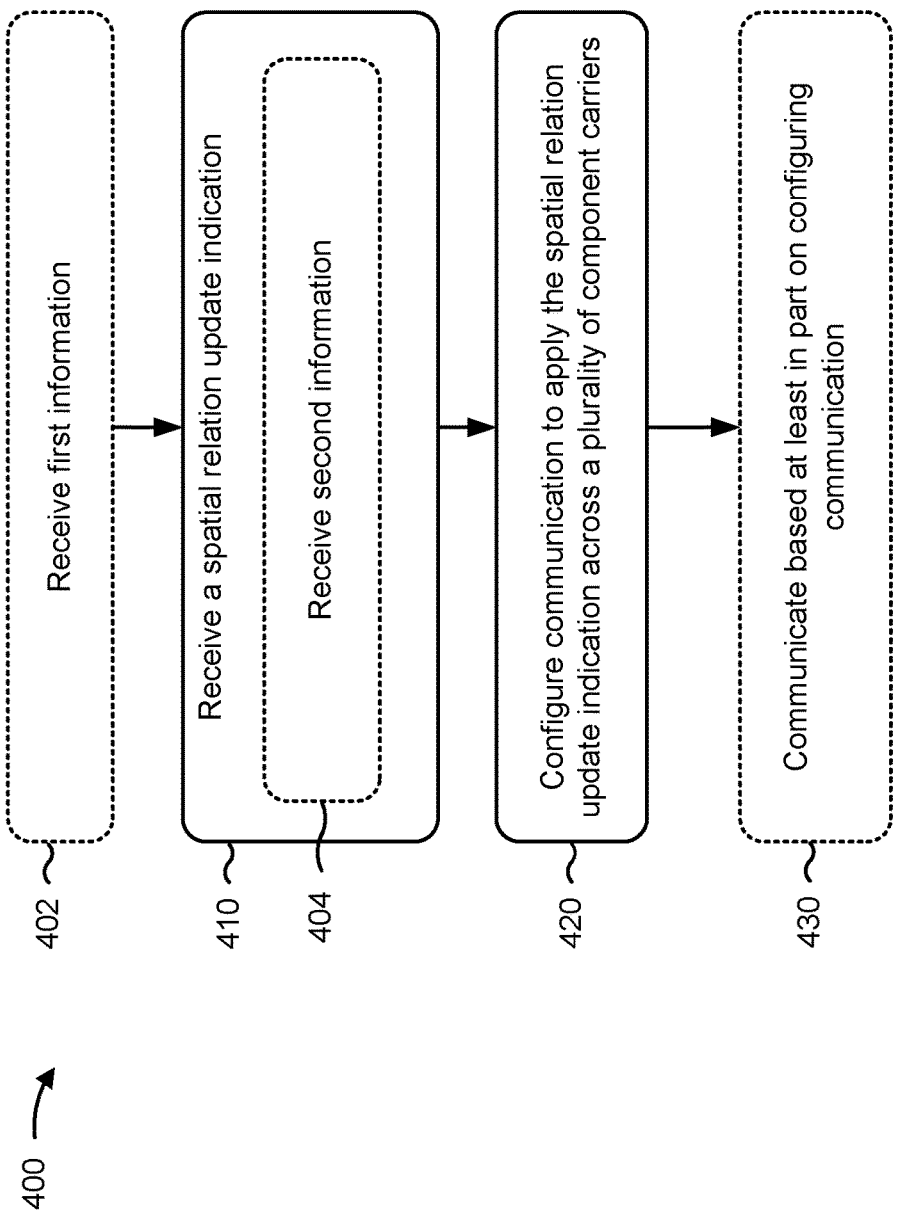
FIG. 4 is a flowchart of a method of wireless communication.

FIG. 4 is a flowchart of a method 400 of wireless communication. The method may be performed by a user equipment (e.g., the UE 120 of FIG. 1, the apparatus 502/502' of FIG. 5 and FIG. 6, and/or the like).

At 402, the user equipment may receive first information. For example, the user equipment (e.g., using antenna 252, DEMOD 254, MIMO detector 256, receive processor 258, controller/processor 280, and/or the like) may receive first information identifying a set of component carrier groups. In a first aspect, the first information is included in radio resource control signaling.

At 404 and 410, the user equipment may receive a spatial relation update indication and, in some aspects, receiving the spatial relation update indication may include receiving second information. For example, the user equipment (e.g., using antenna 252, DEMOD 254, MIMO detector 256, receive processor 258, controller/processor 280, and/or the like) may receive a spatial relation update indication, such as a MAC CE, that identifies a particular reference signal resource set (or list) of a plurality of possible reference signal resource sets (or lists), identifying a spatial relation for one or more SRS resources, as described above. In a second aspect, alone or in combination with the first aspect, and receiving the spatial relation update indication includes receiving second information identifying a particular component carrier group, which includes the plurality of component carriers, of the set of component carrier groups, for which to configure communication and the second information is included in MAC CE signaling. For example, the spatial relation update indication is received after the first information In a third aspect, alone or in combination with one or more of the first and second aspects, the first information is included in at least one of a cell group configuration message, a serving cell configuration message, or an SRS resource set. In a fourth aspect, alone or in combination with one or more of the first through third aspects, the second information includes values that identify a single component carrier group or a plurality of component carrier groups. In a fifth aspect, alone or in combination with one or more of the first through fourth aspects, method 400 includes receiving first information identifying a set of component carrier groups, and receiving the spatial relation update indication includes receiving, after receiving the first information, second information identifying a particular component carrier, of a particular component carrier group that includes the plurality of component carriers, of the set of component carrier groups, for which to configure communication, and configuring communication for each of the plurality of component carriers based at least in part on receiving the second information identifying the particular component carrier of the particular component carrier group that includes the plurality of component carriers.

In a sixth aspect, alone or in combination with one or more of the first through fifth aspects, the first information is included in radio resource control signaling and the second information is included in uplink reference signal resource configuration signaling. In a seventh aspect, alone or in combination with one or more of the first through sixth aspects, receiving the spatial relation update indication includes receiving information including component carrier identifiers of the plurality of component carriers. In an eighth aspect, alone or in combination with one or more of the first through seventh aspects, the component carrier identifiers are included in a MAC CE. In a ninth aspect, alone or in combination with one or more of the first through eighth aspects, the component carrier identifiers are values of a bitmap. In a tenth aspect, alone or in combination with one or more of the first through ninth aspects, the component carrier identifiers are cell identifiers.

At 420, the user equipment may configure communication to apply the spatial relation update indication across a plurality of component carriers. For example, the user equipment (e.g., using controller/processor 280 and/or the like) may configure communication on a plurality of component carriers with the spatial relation for the one or more SRS resources based at least in part on receiving the spatial relation update indicator, as described above. In an eleventh aspect, alone or in combination with one or more of the first through tenth aspects, configuring communication on the plurality of component carriers includes configuring the spatial relation for the one or more SRSs for each bandwidth part of the plurality of component carriers. In a twelfth aspect, alone or in combination with one or more of the first through eleventh aspects, configuring the communication includes configuring the communication across a plurality of cells (e.g., serving cells from a cell group configuration message or a serving cell configuration message).

At 430, in some aspects, the user equipment may communicate based at least in part on configuring communication. For example, the user equipment (e.g., using antenna 252, DEMOD 254, MIMO detector 256, receive processor 258, controller/processor 280, transmit processor 264, TX MIMO processor 266, MOD 254, antenna 252, and/or the like) may communicate one or more SRSs using the spatial relation, as described above. In a twelfth aspect, alone or in combination with one or more of the first through eleventh aspects, the one or more SRSs may be a plurality of aperiodic or semi-persistent SRS resources.

Method 400 may include additional aspects, such as any single aspect or any combination of aspects described above and/or in connection with one or more other processes described elsewhere herein.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
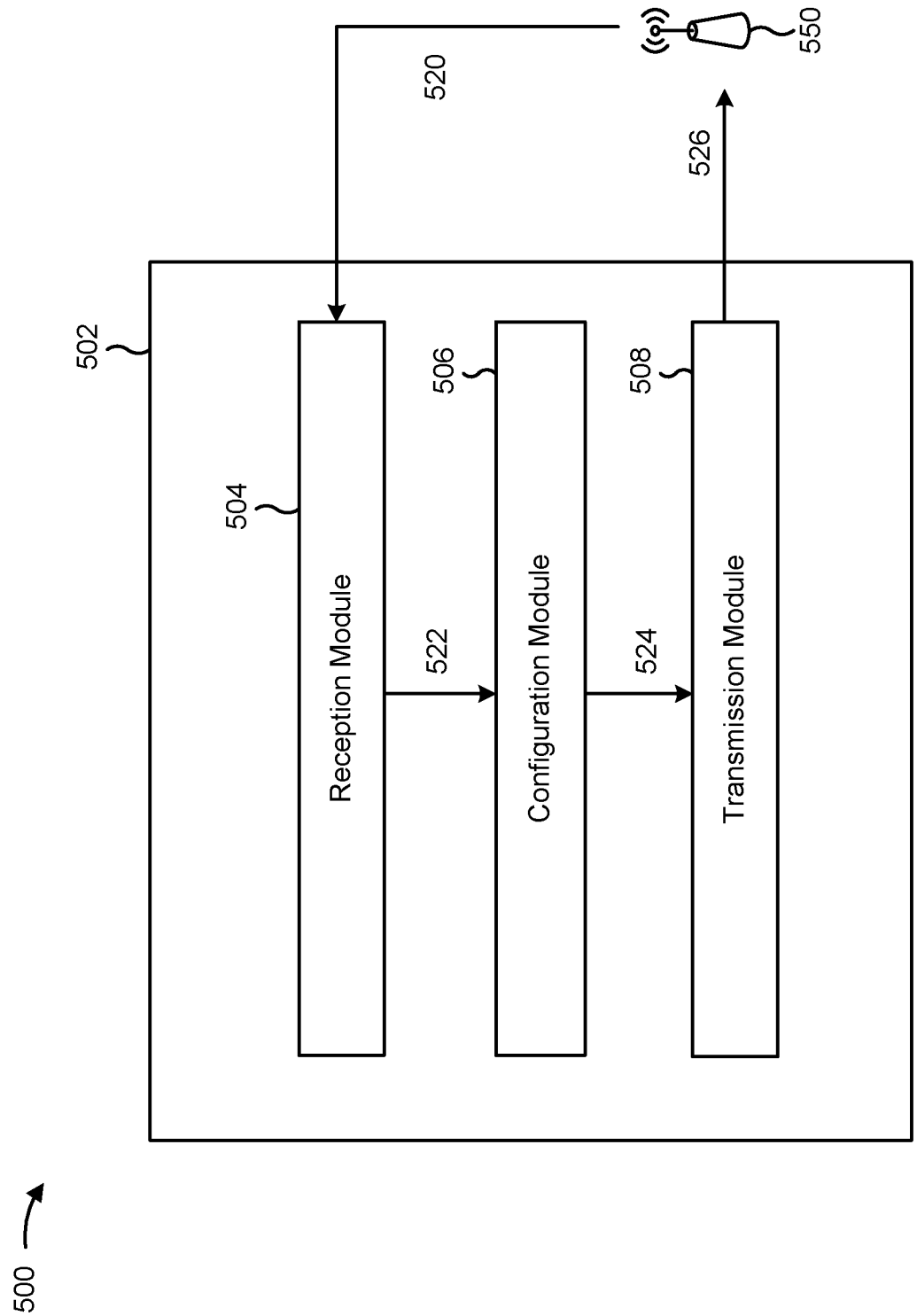
FIG. 5 is a conceptual data flow diagram illustrating data flow between different modules/means/components in an example apparatus.

FIG. 5 is a conceptual data flow diagram 500 illustrating data flow between different modules/means/components in an example apparatus 502. The apparatus 502 may be a UE. In some aspects, the apparatus 502 includes a reception module 504, a configuration module 506, and/or a transmission module 508.

Reception module 504 may receive, as data 520, and from a BS 550, information associated with configuring a spatial relation. For example, the reception module 504 may receive, from the BS 550, first information identifying a plurality of component carriers for which sounding reference signal resource's spatial relations are to be updated. In some configurations, the sounding reference signal (SRS) resources may be identified by an SRS resource set. Additionally, or alternatively, the reception module 504 may receive, from the BS 550, second information identifying a spatial relation to update for a component carrier.

Configuration module 506 may receive, as data 522, and from the reception module 504, information associated with configuring a spatial relation. For example, the configuration module 506 may receive information identifying the spatial relation and information identifying a group of component carriers for which to update the spatial relation for respective sounding reference signal (SRS) resources (e.g., identified by one or more SRS resource sets). In this case, configuration module 506 may set the spatial relation for each sounding reference signal resource (e.g., aperiodic or semi-persistent SRSs) on each bandwidth part of each component carrier indicated by BS 550, as described above.

Transmission module 508 may receive, as data 524, and from the configuration module 506, information associated with communicating with the BS 550. For example, based at least in part on configuring the sounding reference signal resource using the spatial relation, the transmission module 508 may transmit uplink reference signals to the BS 550 as data 526.

The apparatus may include additional modules that perform each of the blocks of the algorithm in the aforementioned method 400 of FIG. 4 and/or the like. Each block in the aforementioned method 400 of FIG. 4 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
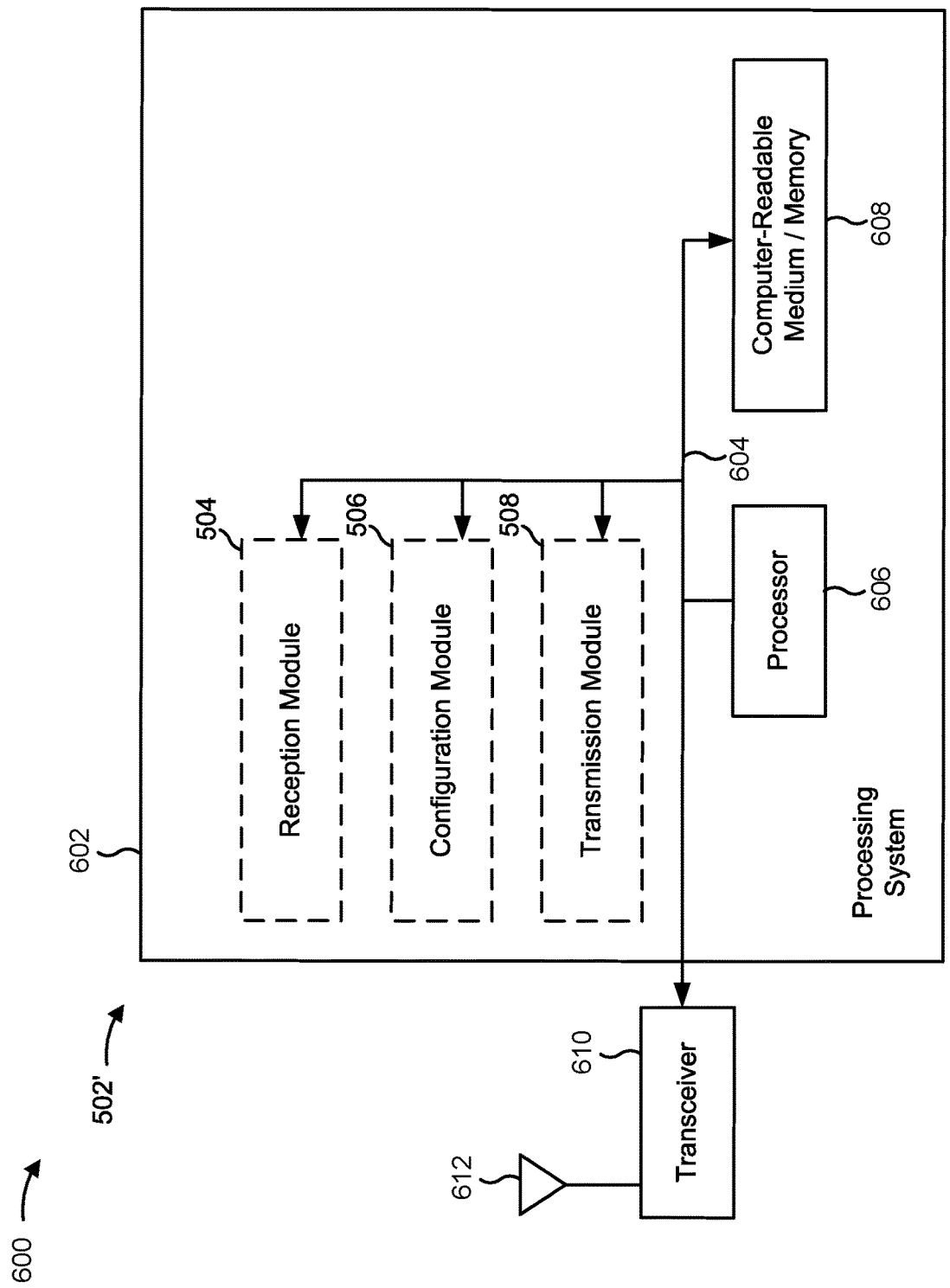
FIG. 6 is a diagram illustrating an example of a hardware implementation for an apparatus employing a processing system.

FIG. 6 is a diagram 600 illustrating an example of a hardware implementation for an apparatus 502' employing a processing system 602. The apparatus 502' may be a UE.

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, 508, and the computer-readable medium/memory 608. The bus 604 may also link various other circuits such as timing sources, peripherals, voltage regulators, and power management circuits, which are well known in the art, and therefore will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602, specifically the reception module 504. In addition, the transceiver 610 receives information from the processing system 602, specifically the transmission module 508, and based at least in part on the received information, generates a signal to be applied to the one or more antennas 612. The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described herein for any particular apparatus. The computer-readable medium/memory 608 may also be used for storing data that is manipulated by the processor 606 when executing software. The processing system further includes at least one of the modules 504, 506, and 508. The modules may be software modules running in the processor 606, resident/stored in the computer-readable medium/memory 608, one or more hardware modules coupled to the processor 606, or some combination thereof. The processing system 602 may be a component of the UE 120 and may include the memory 282 and/or at least one of the TX MIMO processor 266, the RX processor 258, and/or the controller/processor 280.

In some aspects, the apparatus 502/502' for wireless communication includes means for receiving a spatial relation update indicator identifying a spatial relation for an uplink reference signal resource set, means for configuring communication on a plurality of component carriers with the spatial relation for the uplink reference signal resource set based at least in part on receiving the spatial relation update indicator, and/or the like. In other aspects, the apparatus 502/502' for wireless communication includes means for receiving a receiving a spatial relation update indication identifying a spatial relation for one or more sounding reference signal resources; and means for configuring communication on a plurality of component carriers with the spatial relation for the one or more sounding reference signal resources based at least in part on receiving the spatial relation update indication. The aforementioned means may be one or more of the aforementioned modules of the apparatus 502 and/or the processing system 602 of the apparatus 502' configured to perform the functions recited by the aforementioned means. As described elsewhere herein, the processing system 602 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 6 is provided as an example. Other examples may differ from what is described in connection with FIG. 6.

The following provides an overview of some aspects of the present disclosure:

Aspect 1: A method of wireless communication performed by a UE, comprising: receiving a spatial relation update indication identifying a spatial relation for one or more sounding reference signal resources; and configuring communication on a plurality of component carriers with the spatial relation for the one or more sounding reference signal resources based at least in part on receiving the spatial relation update indication.

Aspect 2: The method of aspect 1, further comprising: receiving first information identifying a set of component carrier groups; and wherein receiving the spatial relation update indication comprises: receiving second information identifying a particular component carrier, of a particular component carrier group that includes the plurality of component carriers for which to configure communication, in which the particular component carrier group is included in the set of component carrier groups; and configuring communication for each of the plurality of component carriers based at least in part on receiving the second information identifying the particular component carrier of the particular component carrier group, wherein receiving the spatial relation update indication comprises: receiving second information identifying a particular component carrier, of a particular component carrier group that includes the plurality of component carriers for which to configure communication, in which the particular component carrier group is included in the set of component carrier groups; and configuring communication for each of the plurality of component carriers based at least in part on receiving the second information identifying the particular component carrier of the particular component carrier group.

Aspect 3: The method of aspect 2, wherein at least one component carrier of the plurality of component carriers is not explicitly identified by the second information.

Aspect 4: The method of aspect 2, wherein the first information is included in radio resource control signaling and the second information is included in sounding reference signal resource configuration signaling.

Aspect 5: The method of aspect 2, wherein the first information is included in radio resource control signaling and the second information is included in MAC CE signaling.

Aspect 6: The method of aspect 2, wherein the first information is included in at least one of a cell group configuration message, a serving cell configuration message, or a sounding reference signal resource set.

Aspect 7: The method of aspect 1, wherein configuring the communication on the plurality of component carriers comprises: configuring the communication across a plurality of cells from a cell group configuration message or a serving cell configuration message.

Aspect 8: The method of aspect 1, wherein the spatial relation update indication is included in a MAC CE.

Aspect 9: The method of aspect 8, wherein a plurality of reference signal resource sets are configured, and wherein the MAC CE identifies a particular reference signal resource set of the plurality of reference signal resource sets.

Aspect 10: The method of aspect 1, wherein configuring communication on the plurality of component carriers comprises: configuring the spatial relation for the one or more sounding reference signal resources for each bandwidth part of the plurality of component carriers.

Aspect 11: The method of aspect 1, wherein receiving the spatial relation update indication identifying the spatial relation for the one or more sounding reference signal resources comprises: receiving information including component carrier identifiers of the plurality of component carriers.

Aspect 12: The method of aspect 11, wherein the component carrier identifiers are cell identifiers.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

It should be understood that the specific order or hierarchy of blocks in the processes/flowcharts disclosed is an illustration of example approaches. Based upon design preferences, it should be understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving a spatial relation update indication identifying a spatial relation for one or more sounding reference signal resources,
       wherein the spatial relation update indication includes information identifying a particular component carrier of a particular component carrier group that includes a plurality of component carriers for which to configure a communication; and
   configuring the communication on each of the plurality of component carriers with the spatial relation for the one or more sounding reference signal resources based at least in part on receiving the spatial relation update indication.

2. The method of claim 1, further comprising:
   receiving information identifying a set of component carrier groups, wherein the particular component carrier group is included in the set of component carrier groups.

3. The method of claim 1, wherein at least one component carrier of the plurality of component carriers is not explicitly identified by the information.

4. The method of claim 2, wherein the information identifying the set of component carrier groups is first information;
   wherein the information identifying the particular component carrier is second information; and
   wherein the first information is included in radio resource control signaling and the second information is included in sounding reference signal resource configuration signaling.

5. The method of claim 2, wherein the information identifying the set of component carrier groups is first information;
   wherein the information identifying the particular component carrier is second information; and
   wherein the first information is included in radio resource control signaling and the second information is included in medium access control (MAC) control element (CE) signaling.

6. The method of claim 2, wherein the information identifying the set of component carrier groups is first information;
   wherein the information identifying the particular component carrier is second information; and
   wherein the first information is included in at least one of a cell group configuration message, a serving cell configuration message, or a sounding reference signal resource set.

7. The method of claim 1, wherein configuring the communication on each of the plurality of component carriers comprises:
   configuring the communication across a plurality of cells from a cell group configuration message or a serving cell configuration message.

8. The method of claim 1, wherein the spatial relation update indication is included in a medium access control (MAC) control element (CE).

9. The method of claim 8, wherein a plurality of reference signal resource sets are configured, and
   wherein the MAC CE identifies a particular reference signal resource set of the plurality of reference signal resource sets.

10. The method of claim 1, wherein configuring communication on each of the plurality of component carriers comprises:
    configuring the spatial relation for the one or more sounding reference signal resources for each bandwidth part of the plurality of component carriers.

11. The method of claim 1, wherein receiving the spatial relation update indication comprises:
    receiving information including component carrier identifiers of the plurality of component carriers.

12. The method of claim 11, wherein the component carrier identifiers are cell identifiers.

13. A user equipment (UE) for wireless communication, comprising:
    one or more memories; and
    one or more processors operatively coupled to the one or more memories, the one or more processors individually or collectively configured to:
        receive a spatial relation update indication identifying a spatial relation for one or more sounding reference signal resources,
            wherein the spatial relation update indication includes information identifying a particular component carrier of a particular component carrier group that includes a plurality of component carriers for which to configure a communication; and
configure the communication on each of the plurality of component carriers with the spatial relation for the one or more sounding reference signal resources based at least in part on the spatial relation update indication.

14. The UE of claim 13, wherein the one or more processors are further configured to:
receive information identifying a set of component carrier groups, wherein the particular component carrier group is included in the set of component carrier groups.

15. The UE of claim 13, wherein at least one component carrier of the plurality of component carriers is not explicitly identified by the information.

16. The UE of claim 14, wherein the information identifying 16. the set of component carrier groups is first information;
wherein the information identifying the particular component carrier is second information; and
wherein the first information is included in radio resource control signaling and the second information is included in sounding reference signal resource configuration signaling.

17. The UE of claim 14, wherein the information identifying the set of component carrier groups is first information;
wherein the information identifying the particular component carrier is second information; and
wherein the first information is included in radio resource control signaling and the second information is included in medium access control (MAC) control element (CE) signaling.

18. The UE of claim 14, wherein the information identifying the set of component carrier groups is first information;
wherein the information identifying the particular component carrier is second information; and
wherein the first information is included in at least one of a cell group configuration message, a serving cell configuration message, or a sounding reference signal resource set.

19. The UE of claim 13, wherein the one or more processors, to configure the communication on each of the plurality of component carriers, are configured to:
configure the communication across a plurality of cells from a cell group configuration message or a serving cell configuration message.

20. The UE of claim 13, wherein the spatial relation update indication is a medium access control (MAC) control element (CE).

21. The UE of claim 20, wherein a plurality of reference signal resource sets are configured, and
wherein the MAC CE identifies a particular reference signal resource set of the plurality of reference signal resource sets.

22. The UE of claim 13, wherein the one or more processors, to configure the communication on each of the plurality of component carriers, are configured to:
configure the spatial relation for the one or more sounding reference signal resources for each bandwidth part of the plurality of component carriers.

23. The UE of claim 13, wherein the one or more processors, to receive the spatial relation update indication, are configured to:
receive information including component carrier identifiers of the plurality of component carriers.

24. The UE of claim 23, wherein the component carrier identifiers are cell identifiers.

25. A non-transitory computer-readable medium storing a set of instructions for wireless communication, the set of instructions comprising:
one or more instructions that, when executed by one or more processors of a user equipment (UE), cause the UE to:
receive a spatial relation update indication identifying a spatial relation for one or more sounding reference signal resources,
wherein the spatial relation update indication includes information identifying a particular component carrier of a particular component carrier group that includes a plurality of component carriers for which to configure a communication; and
configure the communication on each of the plurality of component carriers with the spatial relation for the one or more sounding reference signal resources based at least in part on the spatial relation update indication.

26. The non-transitory computer-readable medium of claim 25, wherein the one or more instructions, when executed by the one or more processors, are further configured to:
receive information identifying a set of component carrier groups, wherein the particular component carrier group is included in the set of component carrier groups.

27. The non-transitory computer-readable medium of claim 25, wherein at least one component carrier of the plurality of component carriers is not explicitly identified by the information.

28. An apparatus for wireless communication, comprising:
means for receiving a spatial relation update indication identifying a spatial relation for one or more sounding reference signal resources,
wherein the spatial relation update indication includes information identifying a particular component carrier of a particular component carrier group that includes a plurality of component carriers for which to configure a communication; and
means for configuring the communication on each of the plurality of component carriers with the spatial relation for the one or more sounding reference signal resources based at least in part on receiving the spatial relation update indication.

29. The apparatus of claim 28, further comprising:
means for receiving information identifying a set of component carrier groups, wherein the particular component carrier group is included in the set of component carrier groups.

30. The apparatus of claim 28, wherein at least one component carrier of the plurality of component carriers is not explicitly identified by the information.

* * * * *